(12) United States Patent
Eliasson et al.

(10) Patent No.: US 7,442,914 B2
(45) Date of Patent: Oct. 28, 2008

(54) SYSTEM AND METHOD OF DETERMINING A POSITION OF A RADIATION EMITTING ELEMENT

(75) Inventors: Jonas Ove Philip Eliasson, Copenhagen (DK); Jens Wagenblast Stubbe Østergaard, Lejre (DK)

(73) Assignee: Flatfrog Laboratories AB, Lund (SE)

( * ) Notice: Subject to any disclaimer, the term of this patent is extended or adjusted under 35 U.S.C. 154(b) by 7 days.

(21) Appl. No.: 10/571,561

(22) PCT Filed: Sep. 9, 2004

(86) PCT No.: PCT/DK2004/000596

§ 371 (c)(1),
(2), (4) Date: Dec. 19, 2006

(87) PCT Pub. No.: WO2005/026930

PCT Pub. Date: Mar. 24, 2005

(65) Prior Publication Data

US 2007/0201042 A1    Aug. 30, 2007

(51) Int. Cl.
*G06F 3/042* (2006.01)
(52) U.S. Cl. .................. 250/221; 250/222.1; 345/176
(58) Field of Classification Search ........... 250/221, 250/222.1; 345/173, 175, 176; 178/18.09
See application file for complete search history.

(56) References Cited

U.S. PATENT DOCUMENTS

| | | |
|---|---|---|
| 3,440,426 A | 4/1969 | Bush |
| 4,254,407 A | 3/1981 | Tipon |
| 4,346,376 A | 8/1982 | Mallos |
| 4,484,179 A | 11/1984 | Kasday |
| 4,550,250 A | 10/1985 | Mueller et al. |
| 4,688,933 A | 8/1987 | Lapeyre |
| 4,688,993 A | 8/1987 | Ferris et al. |
| 4,692,809 A | 9/1987 | Beining et al. |
| 4,710,760 A | 12/1987 | Kasday |
| 4,772,763 A | 9/1988 | Garwin et al. |
| 4,812,833 A | 3/1989 | Shimauchi |
| 4,949,079 A | 8/1990 | Loebner |

(Continued)

FOREIGN PATENT DOCUMENTS

DE    3 511 330    10/1986

(Continued)

OTHER PUBLICATIONS

Joseph A. Paradiso, "Several Sensor Approaches that Retrofit Large Surfaces for Interactivity," ACM Ubicomp 2002 Workshop on Collaboration with Interactive Walls and Tables, Gothenburg, Sweden, Sep. 29, 2002.

*Primary Examiner*—John R Lee
(74) *Attorney, Agent, or Firm*—Harness, Dickey & Pierce P.L.C.

(57) ABSTRACT

A method and a system for determining the position of a radiation emitter, which radiation emitter may be an actively radiation emitting stylus, pen, pointer, or the like or may be a passive, radiation scattering/reflecting/diffusing element, such as a pen, pointer, or a finger of an operator. The radiation from the emitter is reflected from that position toward the detector by a reflecting element providing multiple intensity spots on the detector providing sufficient information for determining the position. From the output of the detector, the position of the radiation emitter is determined.

23 Claims, 5 Drawing Sheets

U.S. PATENT DOCUMENTS

| | | | |
|---|---|---|---|
| 5,065,185 A | 11/1991 | Powers et al. |
| 5,073,770 A | 12/1991 | Lowbner |
| 5,159,322 A | 10/1992 | Loebner |
| 5,166,668 A | 11/1992 | Aoyagi |
| 5,227,622 A | 7/1993 | Suzuki |
| 5,254,407 A | 10/1993 | Sergerie et al. |
| 5,484,966 A | 1/1996 | Segen |
| 5,499,098 A | 3/1996 | Ogawa |
| 5,502,568 A | 3/1996 | Ogawa et al. |
| 5,679,930 A | 10/1997 | Katsurahira |
| 5,688,933 A | 11/1997 | Evans et al. |
| 5,945,981 A | 8/1999 | Paull et al. |
| 6,061,177 A | 5/2000 | Fujimoto |
| 6,122,394 A | 9/2000 | Neukermans et al. |
| 6,141,104 A | 10/2000 | Schulz et al. |
| 6,172,667 B1 | 1/2001 | Sayag |
| 6,333,735 B1 | 12/2001 | Anvekar |
| 6,366,276 B1 | 4/2002 | Kunimatsu et al. |
| 6,504,143 B2 | 1/2003 | Koops et al. |
| 6,529,327 B1 | 3/2003 | Graindorge |
| 6,538,644 B1 | 3/2003 | Muraoka |
| 6,664,498 B2 | 12/2003 | Forsman et al. |
| 6,707,027 B2 | 3/2004 | Liess et al. |
| 6,738,051 B2 | 5/2004 | Boyd et al. |
| 2001/0005004 A1 | 6/2001 | Shiratsuki et al. |
| 2003/0048257 A1 | 3/2003 | Mattila |
| 2003/0052257 A1 | 3/2003 | Sumriddetchkajorn |
| 2003/0137494 A1 | 7/2003 | Tulbert |
| 2004/0252091 A1 | 12/2004 | Ma et al. |
| 2007/0034783 A1* | 2/2007 | Eliasson et al. ............ 250/221 |

FOREIGN PATENT DOCUMENTS

| | | |
|---|---|---|
| DE | 689 02 419 | 3/1993 |
| DE | 690 00 920 | 6/1993 |
| DE | 198 09 934 | 9/1999 |
| DE | 100 26 201 | 12/2000 |
| EP | 0 298 837 A1 | 1/1989 |
| EP | 1 204 070 A1 | 5/2002 |
| EP | 1 209 554 A1 | 5/2002 |
| FR | 2 172 828 | 10/1973 |
| FR | 2 614 711 | 11/1988 |
| FR | 2 617 619 | 1/1989 |
| FR | 2 617 620 | 1/1989 |
| FR | 2 676 275 | 11/1992 |
| GB | 1380144 | 1/1975 |
| JP | 58-010232 | 1/1983 |
| JP | 59-202533 | 11/1984 |
| JP | 60 250423 | 12/1985 |
| JP | 61 133430 | 6/1986 |
| JP | 63 143862 | 6/1988 |
| JP | 63 187726 | 8/1988 |
| JP | 03 216719 | 9/1991 |
| JP | 03 216719 A | 9/1991 |
| JP | 05095777 A2 | 4/1993 |
| JP | 07 036603 | 2/1995 |
| JP | 07 036603 A | 2/1995 |
| JP | 08-075659 | 3/1996 |
| JP | 08-149515 | 6/1996 |
| JP | 09243882 | 9/1997 |
| JP | 11045144 | 2/1999 |
| JP | 11-232025 | 8/1999 |
| JP | 2000-259334 | 2/2000 |
| JP | 2000-172438 | 6/2000 |
| JP | 2000-293311 | 10/2000 |
| WO | WO 02/077915 | 10/2002 |
| WO | WO 02/095668 | 11/2002 |
| WO | WO 03/076870 | 9/2003 |

* cited by examiner

SYSTEM AND METHOD OF DETERMINING A POSITION OF A RADIATION EMITTING ELEMENT

FIELD OF THE INVENTION

Example embodiments relate to a system and a method of determining a position of a radiation emitting element and, in particular, to touch pads for e.g. light emitting pens or stylus or for finger touch.

The present invention relates to a system and a method of determining a position of a radiation emitting element and in particular to touch pads for e.g. light emitting pens or stylus or for finger touch.

A number of different technologies exist in the finger touch/touch pad area, but most of them have the drawback that the actual pad is vulnerable and easily brakes.

BACKGROUND

Touch pads in general are described in e.g. U.S. Pat. Nos. 4,346,376, 4,484,179, 4,688,933, 4,710,760, 5,484,966, 5,945,981, and 6,122,394, JP07036603, JP03216719, as well as US 2003/0048257 and 2003/0052257.

SUMMARY

Example embodiments relate to a rugged, simple and cheap touch pad technology which may be used both with fingers, stylus/pen and both active (radiation emitting) or inactive (simply reflecting or scattering incident radiation) or any other type of object.

Example embodiments relate to a system for determining a position of an element emitting electromagnetic radiation, the system comprising: a radiation transmissive member adapted to receive, at a surface thereof, radiation emitted by the emitting element, an at least one-dimensional detector comprising a plurality of individual elements each being adapted to detect radiation and to provide a corresponding signal, the detector being adapted to receive radiation (such as from a first edge part) from the radiation transmissive member, the detector comprising one or more apertures, pinholes, or lenses provided between, on the one side, the detector elements and, on the other side, the emitting element and the reflecting element, a reflecting element at a second edge part of the radiation transmissive member, the reflecting member being adapted to reflect radiation emitted from the emitting member toward the elements of the detector, and means for, on the basis of the signals of the detector relating to the radiation received directly from the emitting element and light emitted thereby and reflected toward the detector by the reflecting element, determining the position of the emitting element.

An at least one-dimensional detector is a detector having a plurality of sensing elements each adapted to provide a separate radiation measurement, where at least part of the sensing elements are positioned at least generally in one direction or dimension, normally along a line. Two-dimensional detectors will normally have a matrix of sensing elements, a number of which will constitute a one-dimensional detector. These sensing elements may be used for the present invention and the others for other purposes, such as for a web cam or the like.

The providing of one or more apertures, pinholes, or lenses at the detector is a simple manner of rendering the detector sensitive to which angle the radiation is received from. In this manner, the position of radiation on the detector will be indicative of the direction from which the radiation was emitted or reflected.

Preferably, the emitting element is an element adapted to emit radiation from an end part thereof and into the transmissive member. In this respect, it should be noted that the transmissive member may have any shape. However, it is desired that one surface is at least substantially flat and that the member in general has a flat outline in order to be able to best guide radiation. However, the path of the radiation may have any shape, such as flat or bent.

Normally, the detector has a field of view defining a plurality of directions from which each of the individual elements is adapted to detect radiation. The detector will normally have a field of view which is the combined fields of view of all sensing elements, so that all sensing elements are able to detect radiation from virtually all positions within the field of view of the detector. It is understood that the apertures/lenses/pinholes will then change the field of view of the individual sensing elements in order to make the sensor angle sensitive.

Preferably, the reflecting element is adapted to reflect at least one predetermined wavelength incident on the reflective element under a first angle into an outgoing wavelength having the same angle to the reflecting element. However, any predetermined relationship between inbound and outbound angles may be determined, as may the overall shape of the reflecting element which normally would be straight, but may have any desired shape.

In the present context, "directly" will mean radiation transmitted from the emitter to the detector without having been reflected, scattered, or diffused out of a predetermined plane defined with an angle to a plane of the transmissive member and comprising the detector and the emitter.

In a preferred embodiment, the detector comprises a single row of detecting elements, such as a straight row of elements.

In one embodiment, the reflecting element is straight, and in another, the reflecting element is curved. In yet another embodiment, the reflecting element comprises at least two straight parts at an angle to each other, wherein each straight part of the reflecting means is adapted to reflect radiation emitted by the emitting means toward the detector. In this manner, more reflections may be incident on the detector, which may help the determination of the position.

Preferably, the detector, the reflecting means, the aperture(s)/pinhole(s)/lens(es), and the emitting means are adapted to be positioned in a predetermined plane, which will normally be a plane in which the field of view lays and which is defined by the transmissive member. One manner of obtaining and maintaining this relationship is when the detector and reflecting means are attached to a predetermined surface, such as of the transmissive member. The aperture(s) preferably, in that situation, extend out of that plane.

Another manner of obtaining a light emitter of this type is one wherein the emitting element comprises a stationary radiation emitter and a movable reflecting element, the radiation emitter being positioned so as to emit radiation toward the reflecting element at least a part of the field of view of the detector in a manner so that radiation is reflected, by the movable reflecting part, toward both the detector and the reflective element (s).

In one embodiment, the emitting element comprises a radiation emitter and a scattering element, where the radiation emitter is positioned so as to emit radiation into the transmissive element and onto a surface thereof and the scattering element is adapted to scatter, such as at the surface of the transmissive element, radiation into the transmissive element and toward the detector and the reflective element.

This scattering element may be e.g. a finger touching the surface of the transmissive element.

In one respect, the emitting element may itself actively emit the radiation (such as from an emitter positioned thereon or therein) or it may passively emit the radiation by reflecting, scattering, or diffusing radiation incident thereon (such as from a radiation emitter external thereto) toward the transforming element.

In general, preferably, the determining means are adapted to determine a plurality of radiation intensity peaks over the detector and, from the positions of the peaks, determine the position of the emitting means.

In a preferred embodiment, the reflecting element and the detector are provided in a self-contained unit. In this manner, relative positioning thereof is pre-determined. Also, any pinhole(s), lens(es) or slit(s) may be provided in the unit as may any light providers in order to assemble all units but the light transmissive member into a single unit, which may be brought into optical contact with the light transmissive member and thereby transform the light transmissive member into a touch screen/pad.

A second aspect of the invention relates to a method of determining a position of an element emitting electromagnetic radiation, the method comprising:
  emitting the radiation into a radiation transmissive member,
  detecting, at a first edge part of the radiation transmissive member, radiation emitted by the emitting element by an at least one-dimensional detector comprising a plurality of individual elements each detecting radiation and providing a corresponding signal, wherein the detecting step comprises transmitting the radiation from the reflecting element and the emitting element through one or more apertures, pinholes, or lenses before detecting the radiation.
  reflecting, at a second edge of the radiation transmissive member and using a reflecting element, radiation emitted from the emitting element toward the detector, and
  determining, on the basis of the signals of the detector relating to the radiation received directly from the emitting element and light emitted thereby and reflected toward the detector by the reflecting element, the position of the emitting element.

As mentioned above, the providing of the aperture(s)/pinhole(s)/lens(es) renders the detector angle sensitive.

Preferably, the detector comprises a single row of detecting elements, such as a straight row.

The reflecting element may be straight, e.g., or curved. In one embodiment, the reflecting element comprises at least two straight parts at an angle to each other, wherein each straight part of the reflecting means reflects radiation emitted by the emitting means toward the detector.

In one preferred embodiment, the method comprises the step of positioning the detector, the reflecting means, the aperture(s)/pinhole(s)/lens(es), and the emitting means in a predetermined plane, preferably a plane in which the field of view lies and which is defined by the transmissive member. Then, the method could further comprise the step of attaching or fixing the detector, the aperture(s)/pinhole(s)/lens(es), and reflecting means to a predetermined surface, such as of the transmissive member.

The emitting element could comprise a radiation emitter and a reflecting element, the radiation emitter emitting radiation toward the reflecting element so that radiation is reflected toward both the detector and the reflective element(s).

In a preferred embodiment, the emitting element emits radiation from an end part thereof and into the transmissive member. In another embodiment, the emitting element comprises a radiation emitter and a scattering element, where the radiation emitter emits radiation into the transmissive element and the scattering element scatters radiation toward the detector and the reflective element.

Again, the determining step preferably comprises determining a plurality of radiation intensity peaks over the detector and, from the positions of the peaks, determining the position of the emitting means.

An interesting addition to the invention relates to a pen/stylus having a means for providing radiation and means for emitting the radiation, the stylus or pen further comprising means for providing one or more characteristics to the radiation and user operable means for controlling the characteristics providing means, the characteristics providing means being adapted to provide, during a predetermined period of time, radiation having sequentially a plurality of different characteristics.

In general, the pen/stylus may have any shape or function for use in selecting information, working with a computer, presenting information; as that of a stylus for a touch pad, a pen for use on paper, a marker, a pointer, or the like.

In this context, a sequential number of characteristics will be different characteristics replacing each other during the period of time. Characteristics may be intensity, colour, amplitude or the like. Thus, the sequence may be a sequence of higher of lower amplitudes/intensities or a series of different wavelengths or wavelength groups.

A sequence of characteristics may e.g. be a series of light pulses, maxima, colours representing a serially transmitted binary signal or code.

Preferably, the emitting means are adapted to emit the radiation at or from a point thereof.

The point of the stylus may be flexible. A flexible point may be made of e.g. silicone or polyurethane. In addition, the point may be made hydrophilic in order to reduce friction or the risk of scratching.

In one embodiment, the radiation providing means is a light emitter, but also IR/NIR/UV radiation may be used.

Additionally, the light providing means could comprise means for receiving light from one or more surrounding light emitter(s), such as a solar cell or a lens—or a mirroring surface positioned at the point of the stylus. This mirroring surface may reflect light provided by the pad itself—such as light transmitted close to the first surface.

A stylus with a flexible point may be used for providing different e.g. line thicknesses when e.g. drawing and for providing information relating to a force exerted during the drawing/writing. This last aspect is particularly interesting in electronic signatures in that, now, not only the positions (the signature itself as written) and the velocity at predetermined points may be used for identifying the signor, but also the pressure exerted at predetermined points.

For example, the characteristics providing means could be adapted to vary characteristics, such as intensity and/or wavelength of the radiation, or a frequency.

Preferably, the user operability is achieved by the controlling means comprising a pressure sensitive area of the stylus, the controlling means being adapted to control the characteristics providing means depending on the pressure determined. This may be a push button operated by the operator or a pressure sensitive tip operated when the operator pushes the tip against a surface (as in a normal writing operation).

In this manner, the stylus may also be used as e.g. a computer mouse now also having one or more buttons.

This variation may be used for a number of purposes: the pad may be adapted to only function with a given stylus or group of stylus, whereby the pad will not react to light entered not having a predetermined intensity variation/wavelength contents/polarisation. Also, different stylus may be decided to provide/represent different colours, e.g. on a monitor illustrating what is drawn on the pad. Alternatively or additionally, the variation may be taken as e.g. a mouse click, and the pad may respond correspondingly as is seen in normal PC's.

Therefore, a last object of the invention is the providing of a plurality, or a set, of the above stylus or pens, each stylus or pen being adapted to output, when operated by the operator, radiation having different sequences of characteristics. In that manner, the pad or system will be able to distinguish between the pens, which may then provide the different colours, erasers or the like.

BRIEF DESCRIPTION OF THE DRAWINGS

In the following, example embodiments will be described with reference to the drawing, wherein.

DETAILED DESCRIPTION OF EXAMPLE EMBODIMENTS

Figure 2:
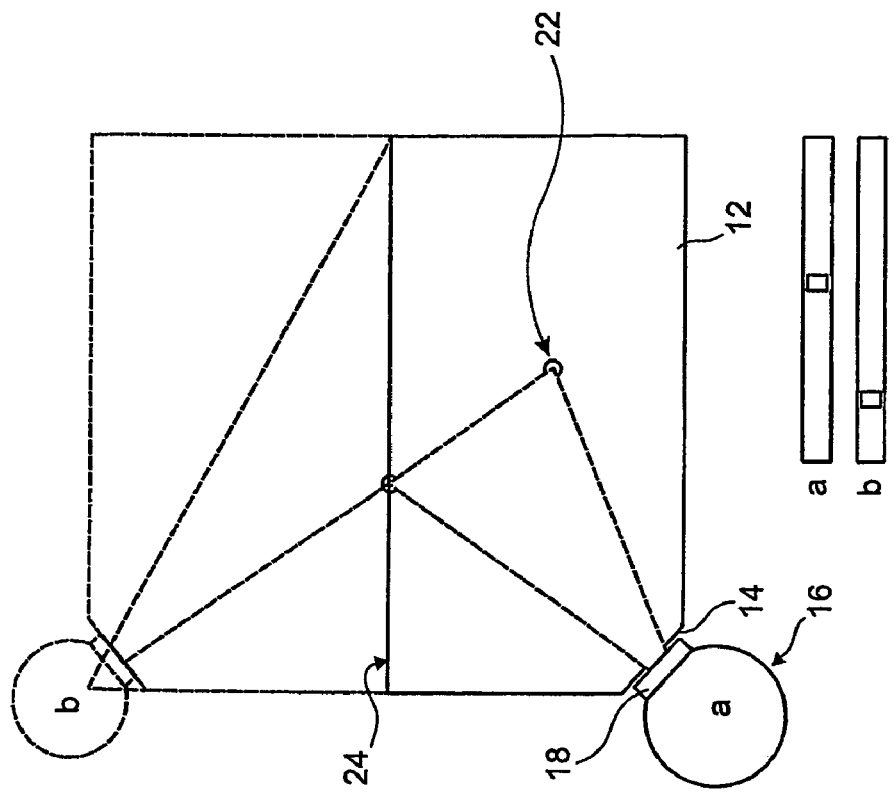
FIG. 2 illustrates the function of the reflecting element of FIG. 1.
Figure 1:
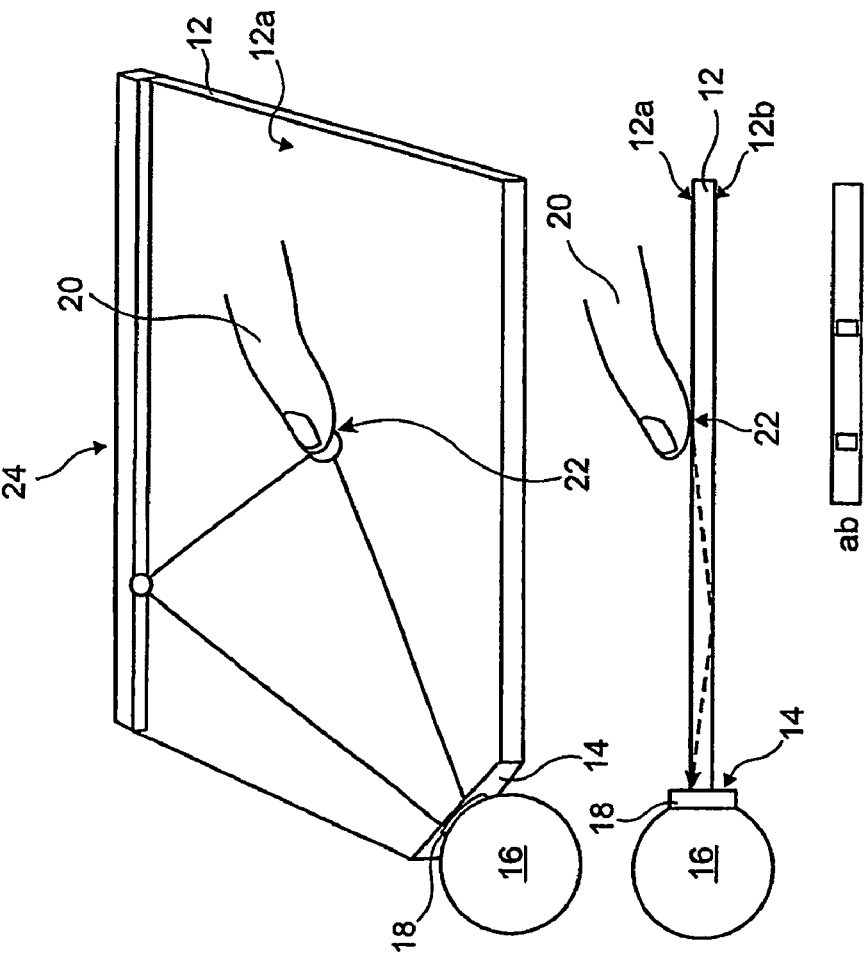
FIG. 1 illustrates, in an elevated side view and from the side, a light emitting pen emitting light into a transmissive body and a detector detecting direct light and reflected light, illustrated is also the light spots detected by the detector.

FIGS. 1 and 2 illustrate the system having a light transmissive element or plate 12 having at one edge portion 14 thereof a detector 16 comprising an aperture 18 (extending out of the plane of the figure) and a number of detecting elements (not illustrated) positioned at a line in the plane of the plate 12. At another edge portion of the transmissive element 12, a reflector 24 is positioned for reflecting light incident thereon from inside the plate 12 back into the plate 12. Inside the plate 12, the light is guided by total internal reflection.

The function of the aperture 18 is to provide the detector 16 with an angle sensitivity. The same function may be obtained using a pinhole or a lens.

Naturally, more apertures/pinholes/lenses may be provided. This will provide additional spots on the detector.

When a light emitter 20, such as the light emitting pen 20, emits light into the light transmissive plate, the upper and lower surfaces thereof (12a and 12b) will ensure that the light is transmitted therein in all directions, and also toward both the detector 16 and the reflector 24.

The light incident on the aperture 18 of the detector 16 will be split into two beams (one defined by the direct line of sight from pixels on the sensor through the aperture 18 and to the point of touch 22 of light entry in the plate 12 and the other beam defined by the aperture 18, the point of touch 22, and the reflector 24.

These two beams will generate two spots or intensity distributions on the detector. These spots or distributions are easily converted to positions, and from these positions, the directions of the beams may be determined quite simply. Again, these directions may be used for determining the position of the point 22 on the plate. This conversion may be a simple triangulation.

Naturally, a wider touch 22 may provide wider spots on the detector.

The two spots or intensity distributions on the detector representing A the direct line of sight and B the line of sight from a virtual detector B is triangulated to calculate the position of the point of touch. Alternatively, pattern recognition in reference to a calibration database containing patterns corresponding to all positions of the touch screen may be used to determine the position.

FIG. 2 illustrates a mathematical model for the use of the reflector by removing the reflector and mirroring the setup of the plate 12 and the detector 16 (the detector b). In that situation, each detector a and b will each determine only a single spot (illustrated by the two lines), and from these spots, the point 22 will again be easily determined by simple triangulation.

From FIG. 2 it is seen that the detector b will, in fact, not need a "full" detector 16 in that only part of the full field of view of the detector (as that of detector a) will not be needed.

A problem may be that the peaks actually overlap, which makes the separation and determination thereof difficult. However, if the peaks do not totally overlap, a non-overlapping half of a peak may be determined and used (mirrored) in order to subtract this peak from the other peak, whereby the other peak is now also predicted quite easily. Naturally, the overlap may require that this process is iterated more than once.

Figure 3:
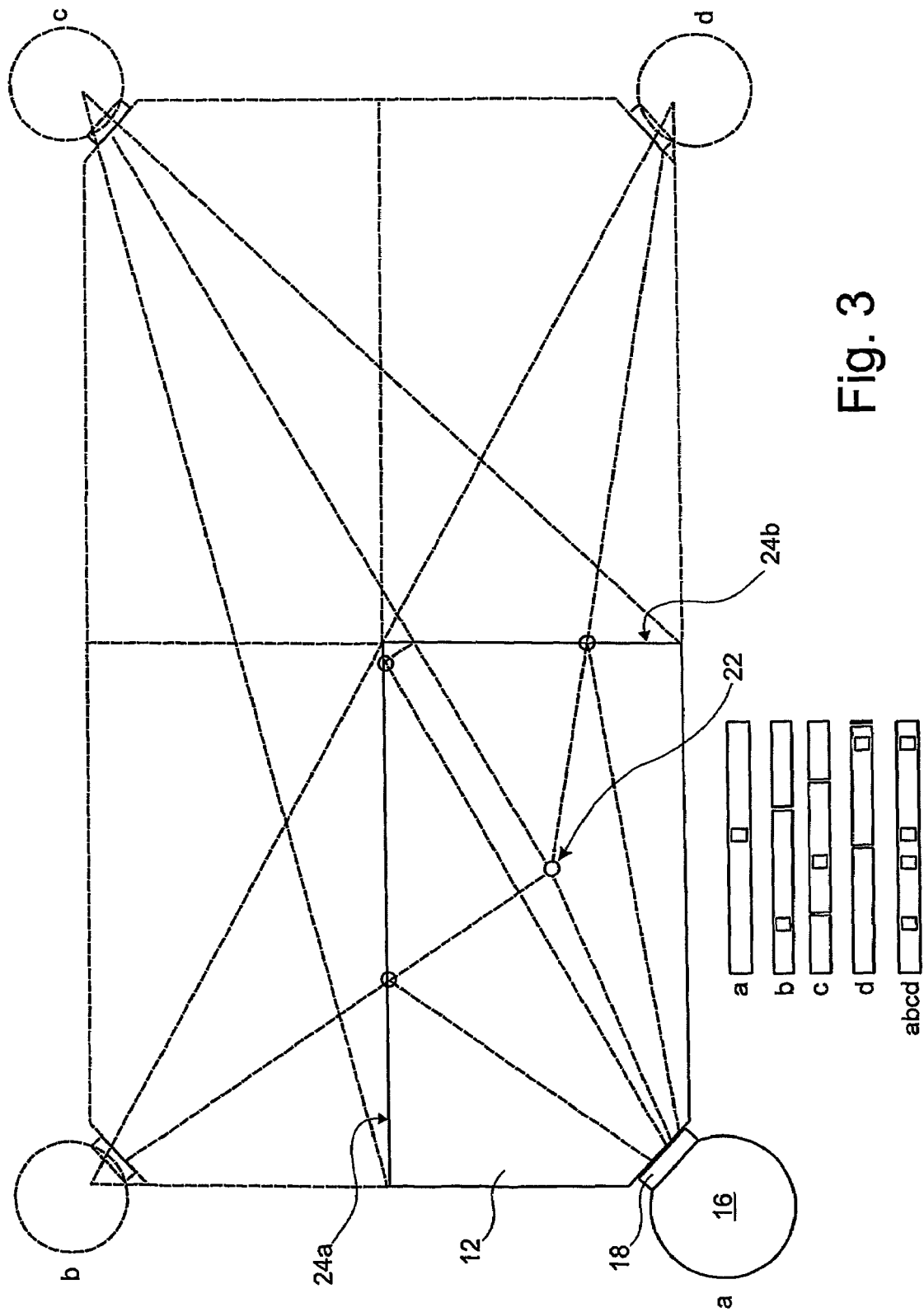
FIG. 3 illustrates the function of a reflecting element having two reflecting surfaces with an angle to each other.

In FIG. 3, a similar setup is illustrated, but where the reflector 24 now has two parts, 24a and 24b which together cover two edge portions of the plate 12.

This will provide a total of up to four spots on the detector 16. Again, in this figure, a mathematical model is illustrated by removing the reflector 24 and providing now three reflections of the plate 12.

Again, it is seen that the intensity peaks or spots on the detector may be used for determining the position 22.

In fact, the method of FIG. 3 provides abundant information (more information than is absolutely required), and this information may be used for error checking the system or for providing a better estimate of the position in that the determination of each peak is made with a certain error.

A plurality of ways is possible for determining the position of the spots or intensity peaks on the detector. It is clear that the detector will detect the intensity of the incident light at the positions of the individual detector elements. However, these elements will normally not cover the full extension of the detector, and each element will provide a single mean intensity for the full extension of that element. Thus, this will provide a stepped intensity profile of an intensity maximum. However, the actual maximum may have been between two detector elements, and a number of ways exist of determining the actual position of this maximum.

The size and/or shape of the tops of the intensity pattern may be determined by assuming that all maxima or tops in the intensity pattern detected are identical and then combining all tops to determine the overall shape of a top. From this combination, the actual, e.g. maximum, of all tops may be determined even though the resolution of the detector is much lower.

In another scheme, the shape of the light emitter (the tops) is predefined, whereby this predefined top shape may be used for determining the actual position of the maximum.

In a third scheme, each reflecting surface may be adapted to actually reflect only a single wavelength (or wavelength interval), which differ from each other, so that the reflections from each reflecting surface is easily detectable using e.g. a detector with a filter fitted in front (such as a detector using one one-dimensional detector for each wavelength (interval).

Naturally, if it is ascertained that a reflection peak on the detector is deformed by the reflector, a reverse shaping may be performed mathematically before adding the peaks.

The above embodiments have been described where light is introduced into the light transmissive plate 12. This light may also be transmitted into the plate 12 by other means, such as due to a reflection from an outside light source, or the light may be transmitted inside the plate 12 toward a pointing device (such as a finger) which scatters the light provided inside the plate 12 toward the detector 16 and the reflector 24.

Light may be provided by an external light source into the area occupied by the plate 12 in FIGS. 1 and 2, and the pen 20 may be replaced by a reflective or scattering pen, finger or the like, which reflects or scatters the light in the directions described.

Figure 4:
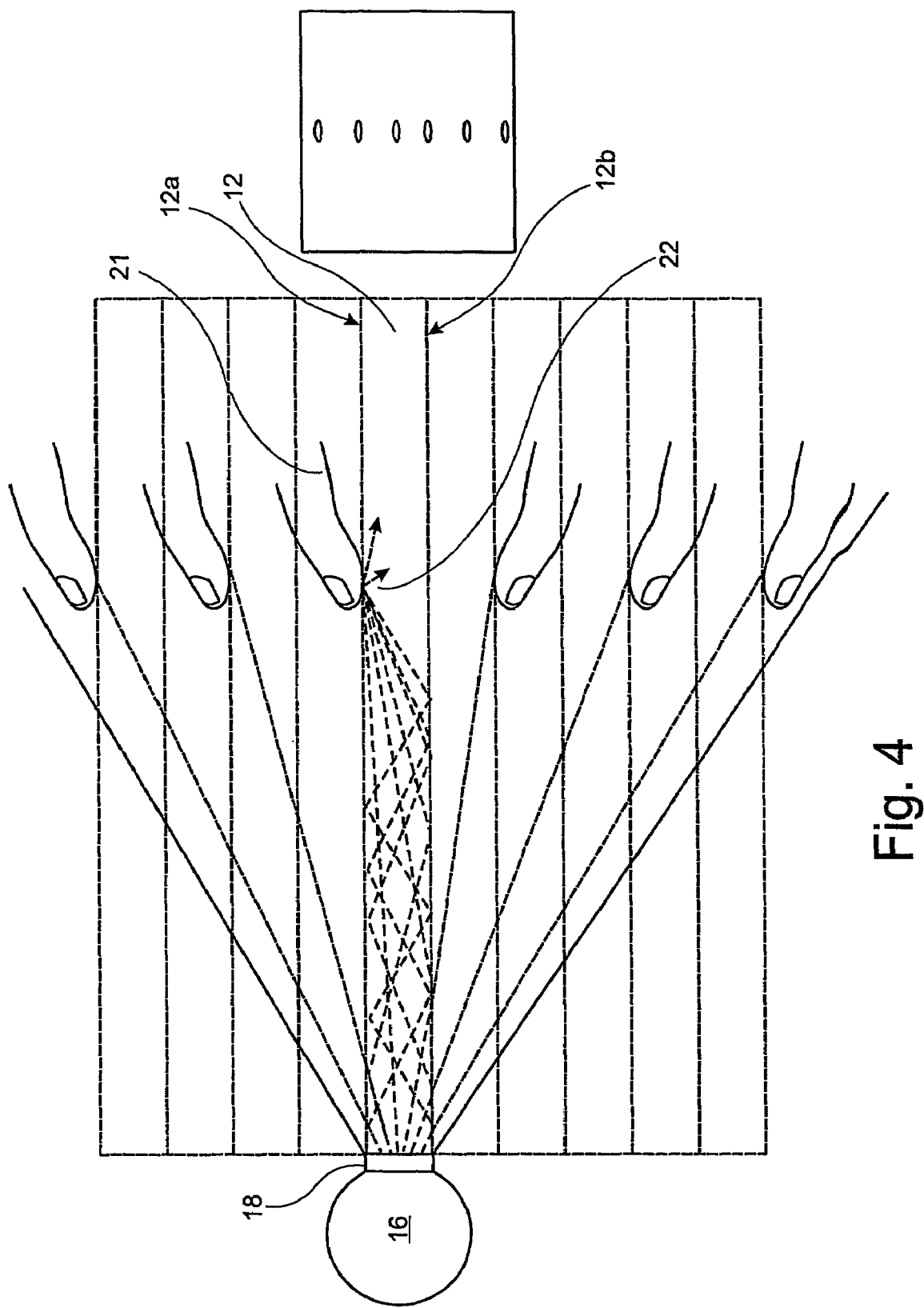
FIG. 4 illustrates an embodiment different from that of FIGS. 1 and 2, FIG. 5. illustrates a stylus for use with e.g. touch screens.

FIG. 4 illustrates another manner of obtaining the position determination, where, again, the transmissive plate 12 is provided together with the detector 16 again having the aperture 18, now being a point aperture having a predetermined diameter determined on the basis of the dimensions of the other elements and the precision desired in the position determination.

FIG. 4 is seen from the side, and plate 12 may be a standard, e.g. square plate where the detector 16 is positioned at a corner thereof. No other reflecting member 24 is required in this embodiment, in that the plate 12 itself (see below) will provide reflections.

The detector, in this embodiment, however, is a two-dimensional CCD, and the functionality is as follows:

Light scattered by the scattering element (here the finger 21) (which light has been introduced into the plate 12 by a light emitter or is transmitted to the finger from e.g. a light source positioned below the plate 12) is scattered in a general direction toward the detector 16 and the aperture 18.

Due to the thickness of the plate 12, the light will travel toward the aperture in a number of different angles to the surfaces 12a and 12b of the plate 12. Due to the refractive index of the plate 12, all rays incident on the interface (at surfaces 12a and b) will be reflected back into the plate 12.

The number of different "modes" (angles to the surfaces) which are possible (fill number of reflections at one of the surfaces and still intercepting the aperture 18) will increase with the distance between the aperture 18 and the finger 21, where by this number of "modes" will describe the distance from the aperture to the finger.

The individual spots are, in fact, themselves projected images of the point of touch that contain 2D information on the exact form and size of the point of touch. This information may be used for quite a number of applications.

Each of these modes will generate an intensity spot on the detector, and all modes will, in total, generate a line of spots on the detector (in a line in the plate of FIG. 4). From this number, the distance to the finger may be determined.

In the other dimension (in the plane of the plate 12), the operation of the aperture 18 will be as that in FIGS. 1 and 2, whereby the position along the other direction (out of the plane of FIG. 4) of the line of spots on the detector 16 will determine the actual angle of incident light (the direct line between the spot 22 and the aperture) may be determined.

In FIG. 4, the intensity spots on the detector are illustrated, where the number of spots in the vertical direction relates to the distance to the point 22 and the horizontal position of the line of spots relate to the angle of the point 22 vis-à-vis the aperture.

Thus, again the position of the point 22 may be determined, but now in polar coordinates.

It is clear that even though the above embodiments are described in relation to light, all types of radiation may be used.

Also, different types of radiation (such as different wavelengths) may be used in the same device, whereby a plurality of lines, e.g., of a CCD are illuminated with the radiation from the aperture, where each line has filters filtering different wavelengths, so that the detector is able to not only determine the position but also the identity or type of light provider (finger scattering light of a first wavelength, a light emitting pen emitting light of a second wavelength, or the like).

Noise stemming from grease, cracks and surface imperfections can be cancelled out by localising them on the sensor image and then subtract this information from the combined detecting information comprising both noise and point of touch. This will lead to a clean input signal even though the screen use will become more and more noise infected.

Naturally, the present embodiments are indifferent as to wavelength of the radiation. Normally, visible light, IR radiation, or NIR radiation can be used, but also UV radiation will be suitable according to the invention.

This transmissive element may, in fact, be used as a monitor or screen in order to provide interactiveness with e.g. a computer or the like.

The light/radiation provider may be a light/radiation emitting element (such as a radiation emitting pen, stylus, marker, pointer or the like) or a reflecting/scattering/diffusing element (such as a pen, stylus, marker, pointer, finger or the like) reflecting/scattering/diffusing radiation from a radiation source and toward the bar code.

Figure 6:
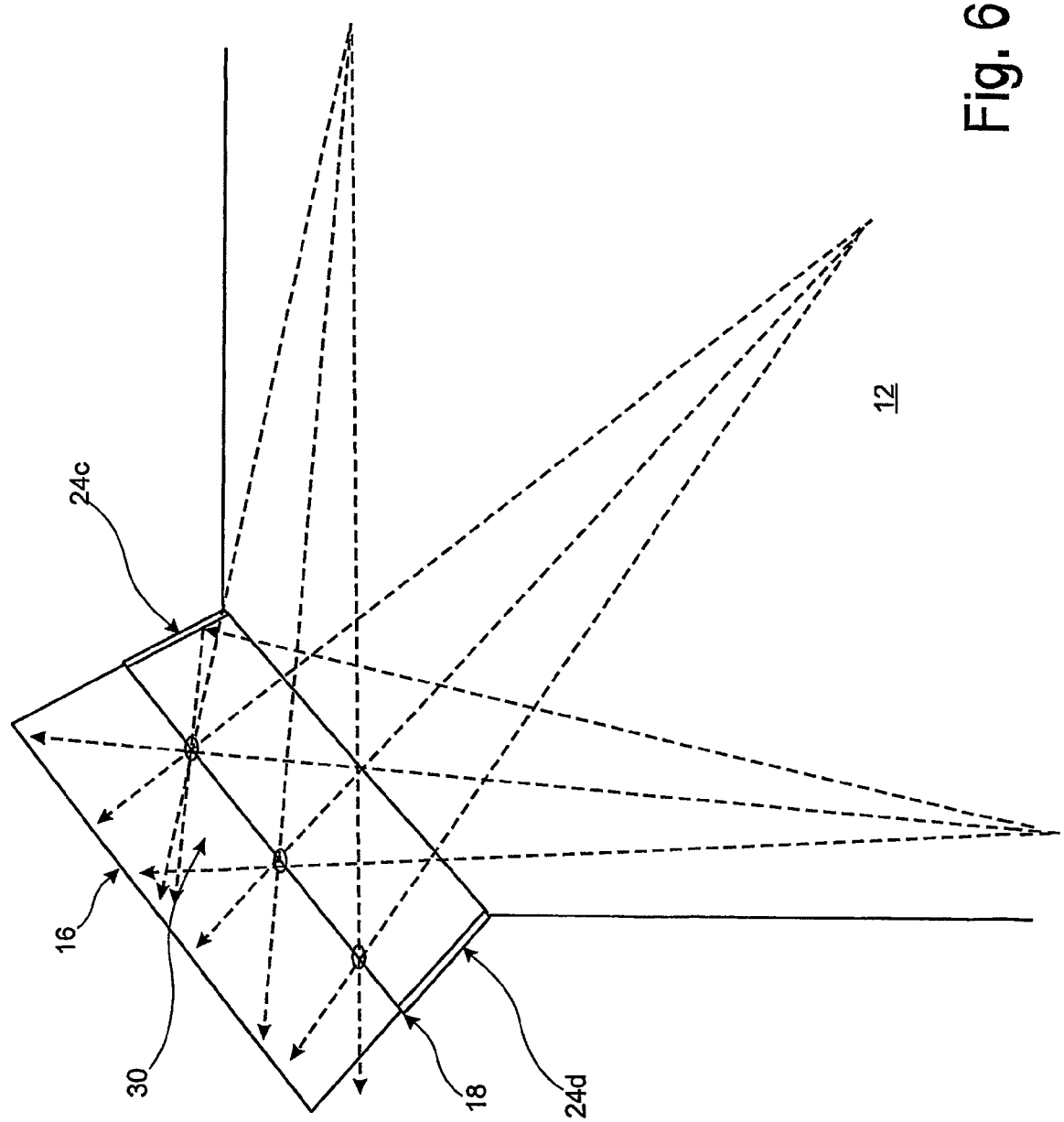
FIG. 6 illustrates a unitary detecting unit comprising both the detector and the reflector.

FIG. 6 illustrates an embodiment in which two the mirrors 24c and 24d, apertures 18 and the sensor 16 are provided in a single self-contained unit (30) that can be attached in direct optical contact to a light transmissive means 12.

The unit 30 then comprises all optical parts except the light transmissive means 12 in one integrated part that is easily produced in mass production with a high accuracy of the mirror surfaces, aperture array openings, sensor position, connectors to power and signal and refractive index of the transparent material used, etc.

A further simplification could be to add light sources to the single unit 30 so that it now integrates all elements necessary to transform a light transmissive means 12 to a touch screen.

The unit 30 can be connected to the light transmissive means 12 at the edge or the upper or under surface thereof, and it can be positioned anywhere at the surface of an existing light transmissive means 12, such as an ordinary window and create an optical touch screen without further need for alteration of the light transmissive means 12.

Figure 5:
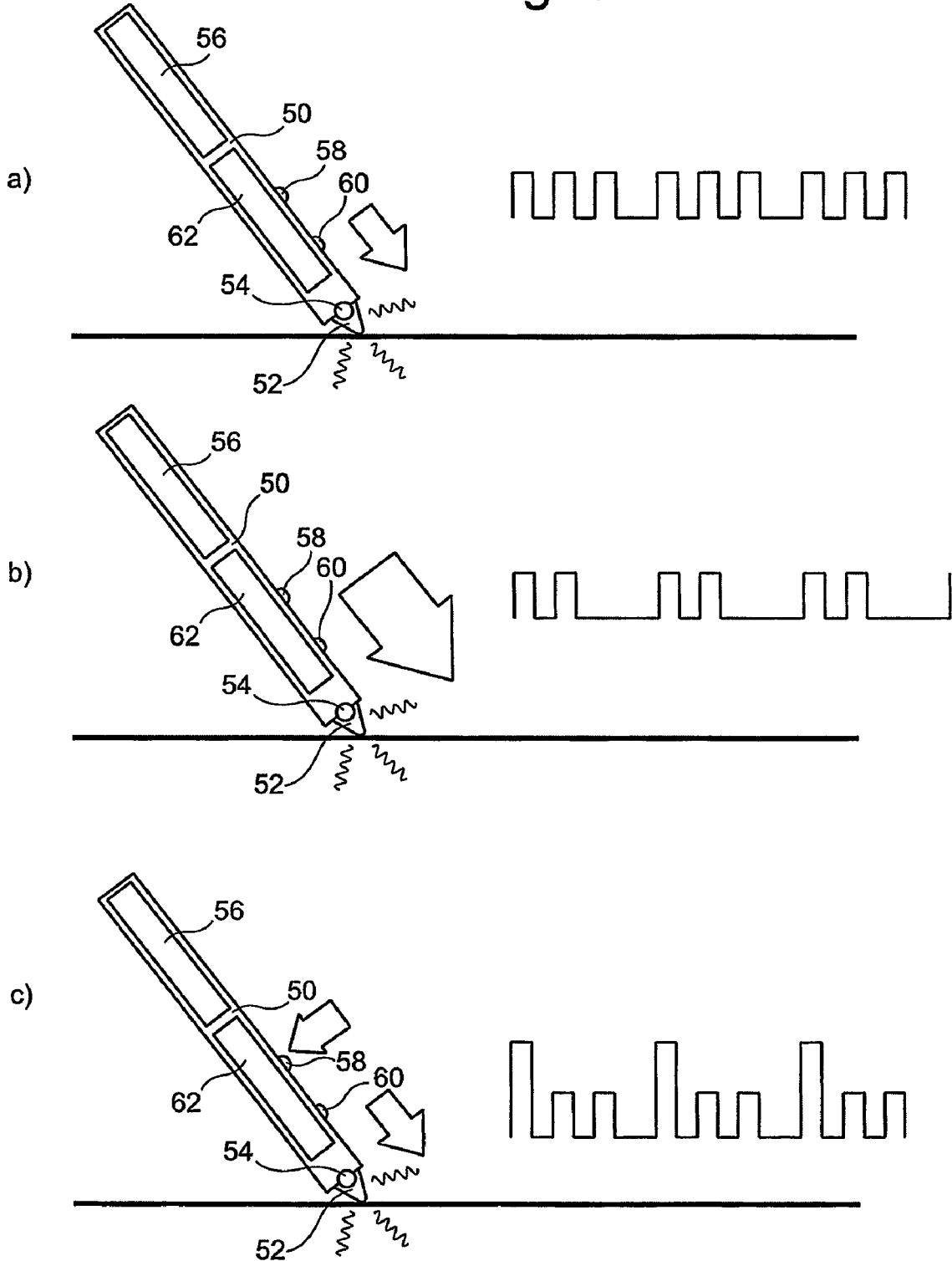

FIG. 5 illustrates a pen or stylus for use with e.g. a touch pad. Three manners of operating the pen are illustrated by a, b, and c.

The pen 50 is hand held and has a light emitting tip 52, a light emitter 54 for providing light to the tip 52, a battery compartment 56, two user operatable push buttons 58 and 60 as well as a processor 62.

The processor is able to control the light emitter so as to change one or more of the characteristics of the light emitted, such as the intensity, wavelength or the like.

Also, the processor is adapted to determine a pressure with which the tip 52 is forced toward or against a surface.

Thus, the processor controls the light emitter to provide light having a first sequence of characteristics (a) when the tip is forced with a first force (arrow). This sequence of characteristics may be a variation in intensity as illustrated.

Forcing the tip even further (b), the sequence of characteristics changes (such as when using the pen as a computer mouse now simulating a mouse click).

Other combinations (c) will be obtainable when operating the buttons, such as the button 58 together with the forcing of the tip (arrows) in order to provide even further sequences detectable by e.g. a touch pad.

In addition, a number of pens may be used having different user operatable features. These pens may provide different functionalities in the touch pad or in e.g. a computer illustrating the instructions entered by the pens: pens with different colours, larger tip pressure providing a bold text or a fatter line, a pen acting as eraser, another may be acting as a computer mouse.

All pens may be identified by their sequences of characteristics, and not-standardized pens may be fully rejected.

The invention claimed is:

1. A system for determining a position of an radiation emitting element, the system comprising:
    a radiation transmissive member adapted to receive, at a surface thereof, radiation emitted by the emitting element and adapted to guide radiation therein by total internal reflection,
    an at least one-dimensional detector including a plurality of individual elements each being adapted to detect radiation and to provide a corresponding signal, the detector being adapted to receive radiation from a first edge part of the radiation transmissive member, and
    a reflecting element at a second edge part of the radiation transmissive member, the reflecting element being adapted to reflect light incident thereon from inside the radiation transmissive member back into the radiation transmissive member and adapted to reflect radiation emitted from the emitting element toward the detecting elements of the detector, the detector includes one or more apertures, pinholes, or lenses provided between the detecting elements and the emitting element, and between the detecting elements and the reflecting element, and
    a device for determining the position of the emitting element, on the basis of the signal of the detector relating to radiation which is received directly from the emitting element and to radiation which is emitted by the emitting element and reflected toward the detector by the reflecting element.

2. A system according to claim 1, wherein the detector comprises a single row of detecting elements.

3. A system according to claim 1, wherein the reflecting element is straight.

4. A system according to claim 1, wherein the reflecting element is curved.

5. A system according to claim 1, wherein the reflecting element comprises at least two straight parts at an angle to each other, each straight part of the reflecting element is adapted to reflect radiation emitted by the emitting element toward the detector.

6. A system according to claim 1, wherein the detector, the reflecting element, and the emitting element are adapted to be positioned in a predetermined plane.

7. A system according to claim 6, wherein the detector and the reflecting element are attached to a predetermined surface.

8. A system according to claim 6, wherein the emitting element is adapted to emit radiation from a radius thereof.

9. A system according to claim 7, wherein the emitting element comprises a stationary radiation emitter and a movable reflecting part, the stationary radiation emitter being positioned so as to emit radiation toward the movable reflecting element at at least part of a field of view of the detector in a manner so that radiation is reflected, by the movable reflecting part, toward both the detector and the reflective element.

10. A system according to claim 1, wherein the emitting element is an element adapted to emit radiation from an end part thereof and into the radiation transmissive member.

11. A system according to claim 1, wherein the emitting element comprises a radiation emitter and a scattering element, the radiation emitter being positioned so as to emit radiation into the radiation transmissive member and the scattering element is adapted to scatter radiation, such as at a surface of the radiation transmissive member, toward the detector and the reflective element.

12. A system according to claim 1, wherein the determining device is adapted to determine a plurality of radiation intensity peaks over the detector and, from the positions of the peaks, determine the position of the emitting element.

13. A method of determining a position of an electromagnetic radiation emitting element, the method comprising:
    emitting the radiation into a radiation transmissive member adapted to guide radiation therein by total internal reflection,
    detecting, at a first edge part of the radiation transmissive member and using an at least one-dimensional detector having a plurality of individual elements, each element detecting radiation and providing a corresponding signal, radiation emitted by the emitting element,
    reflecting, at a second edge of the radiation transmissive member and using a reflecting element reflecting light incident thereon from inside the radiation transmissive member back into the radiation transmissive member, radiation emitted from the emitting element toward the detector, the detecting step includes transmitting the radiation from the reflecting element and the emitting element through one or more apertures, pinholes, or lenses before detecting the radiation, and
    determining the position of the emitting element, on the basis of the signal of the detector relating to radiation which is received directly from the emitting element and to radiation which is emitted by the emitting element and reflected toward the detector by the reflecting element.

14. A method according to claim 13, wherein the detector comprises a single row of detecting elements.

15. A method according to claim 13, wherein the reflecting element comprises at least two straight parts at an angle to each other, each straight part of the reflecting element reflects radiation emitted by the emitting element toward the detector.

16. A method according to claim 13, further comprising the step of positioning the detector, the aperture/pinhole/lens, the reflecting element and the emitting element in a predetermined plane.

17. A method according to claim 16, further comprising the step of attaching or fixing the detector, the aperture/pinhole/lens and the reflecting element to a predetermined surface.

18. A method according to claim 16, wherein the emitting element emits radiation from a radius thereof.

19. A method according to claim 16, wherein the emitting element comprises a stationary radiation emitter and a moving reflecting element, the radiation emitter emitting radiation towards the reflecting element so that radiation is reflected towards both the detector and the reflective element.

20. A method according to claim 13, wherein the emitting element emits radiation from an end part thereof and into the radiation transmissive member.

21. A method according to claim 13, wherein the emitting element comprises a radiation emitter and a scattering element, the radiation emitter emits radiation into the radiation transmissive member and the scattering element scatters at a surface of the radiation transmissive member, radiation toward the detector and the reflective element.

22. A method according to claim 13, wherein the determining step comprises determining a plurality of radiation intensity peaks over the detector and, from the positions of the peaks, determining the position of the emitting element.

23. A system according to claim 1, wherein the reflecting element and the detector are provided in a self-contained unit.

* * * * *

UNITED STATES PATENT AND TRADEMARK OFFICE
CERTIFICATE OF CORRECTION

PATENT NO. : 7,442,914 B2 Page 1 of 1
APPLICATION NO. : 10/571561
DATED : October 28, 2008
INVENTOR(S) : Jonas Ove Philip Eliasson et al.

It is certified that error appears in the above-identified patent and that said Letters Patent is hereby corrected as shown below:

Title Page, item (60) Related U.S. Application Data should read as follows:

(60) Provisional Application No. 60/502,246, filed on September 12, 2003.

Signed and Sealed this

Twenty-fourth Day of February, 2009

JOHN DOLL
*Acting Director of the United States Patent and Trademark Office*